July 14, 1931.          L. J. PURCELL          1,814,528
MULTIPLE BLADE KNIFE WITH ADJUSTABLE BLADES
Filed Aug. 23, 1930
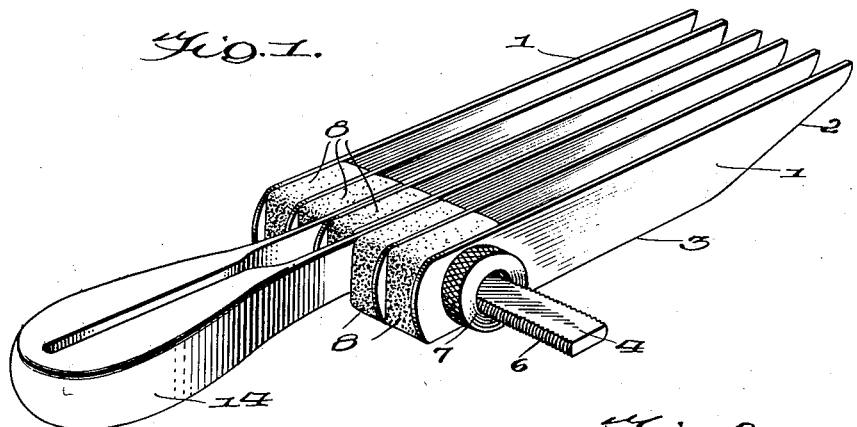
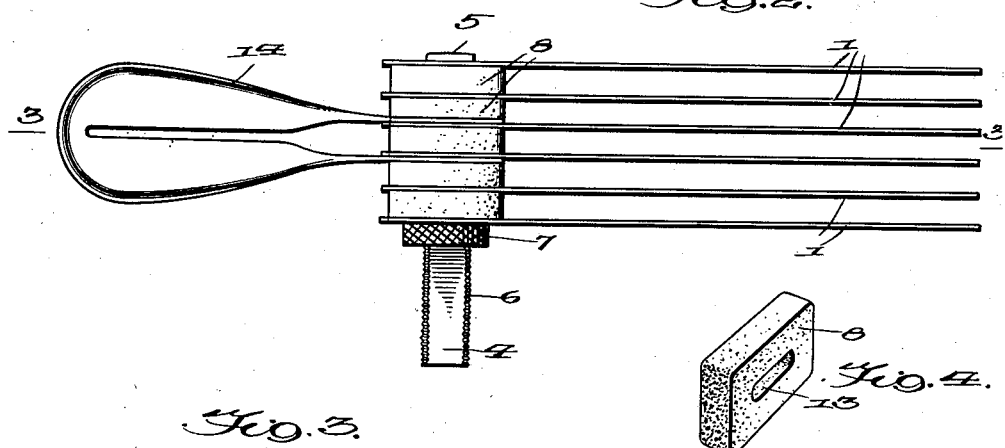
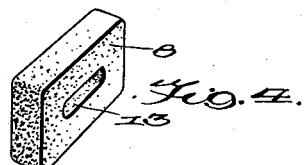
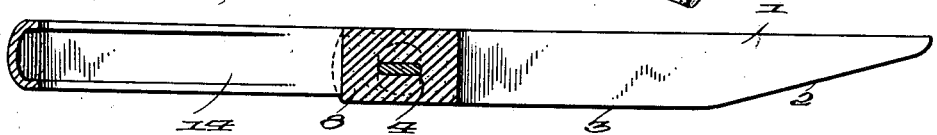
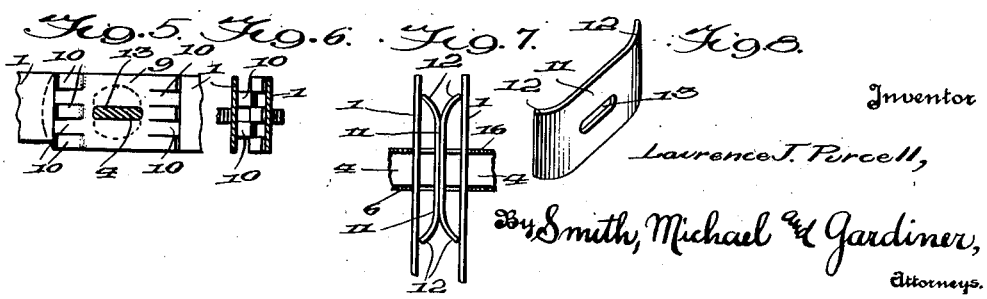
Inventor
Lawrence J. Purcell,
By Smith, Michael & Gardiner,
Attorneys.

Patented July 14, 1931

1,814,528

UNITED STATES PATENT OFFICE

LAURENCE J. PURCELL, OF NEW YORK, N. Y.

MULTIPLE BLADE KNIFE WITH ADJUSTABLE BLADES

Application filed August 23, 1930. Serial No. 477,434.

My invention relates to knives, and has particular reference to multiple blade knives in which the blades are relatively adjustable to vary the distance between the individual blades.

It is an object of my invention to provide a knife comprising a plurality of individual blades arranged in parallel, spaced relation, and so mounted that the blades are simultaneously and uniformly adjustable to vary the distance therebetween.

It is a further object of my invention to provide a knife comprising a plurality of individual blades arranged in parallel, spaced relation, each of the blades being spaced from the adjacent blade by means of a resilient washer or separating member, said blades and washers being alternately arranged between the outermost blades on a common supporting shaft, and having means for increasing or decreasing the pressure on the resilient washers or separating members to vary the distance between the blades and, hence, the thickness of the slice or cut made by the multiple blade knife.

It is a further object of my invention to provide a multiple blade knife comprising a plurality of individual blades mounted in parallel, spaced relation on a common supporting shaft and having resilient means between the individual blades which can be simultaneously and uniformly expanded or contracted to vary the distances between the blades, and to associate with the said supporting shaft a suitable handle for the shaft, the blades and the washers carried thereby, said handle likewise being resilient to permit the uniform adjustment of the blades.

In the distribution and preparation of various food products such as bread, cake, cheese, meats, fruits, vegetables, and the like, it is often necessary or desirable to cut the product into a plurality of slices or squares of uniform thickness or dimensions, and these operations cannot be quickly and satisfactorily performed by the use of the ordinary single blade knife. Hence, it is an object of my invention to provide a multiple blade knife, with adjustable blades, that is simple in construction, cheap and easy to manufacture, strong and durable, and highly efficient for accomplishing the slicing or cutting of food products or other commodities.

Referring to the accompanying drawings, wherein I have shown several preferred embodiments of my invention:

Figure 1 is a perspective view of my improved multiple blade knife,

Fig. 2 is a plan view of the same,

Fig. 3 is a sectional view on the line 3—3 of Fig. 2,

Fig. 4 is a perspective view of one form of resilient washer or separating member, Fig. 5 is a fragmental view of a portion of one of the blades showing a second form of resilient washer or separating member, Fig. 6 is a sectional view of the form of washer shown in Fig. 5 showing the same in position on the supporting shaft between two adjacent blades, and Figs. 7 and 8 are plan and perspective views respectively of a third form of resilient washer or separating member, Fig. 7 showing two of the members in position on the supporting shaft between two adjacent blades and Fig. 8 showing one of the members per se.

In the drawings, wherein like reference characters are employed to designate like parts throughout the several views, the numeral 1 designates one of the blade members, each blade member having a forwardly-tapering end 2 which, together with the edge 3, is sharpened to provide a continuous cutting edge from the base of the blade to the point thereof.

While I have shown and described a specific type or form of blade, it is to be understood that any conventional or preferred type or form of blade may be used. Near the base of each blade, I provide a non-circular, preferably rectangular, opening adapted to receive therethrough a bolt 4 having an enlarged head 5, and having a transverse cross-sectional shape corresponding in configuration to the non-circular, preferably rectangular opening in each of the blade members. The bolt 4 is threaded throughout its length as indicated at 6 and is adapted to receive thereon the adjusting nut 7.

The resilient washer or separating members may comprise a block of resilient material 8 such as shown in Fig. 4, which may be cut from rubber, sponge rubber or other inherently resilient material. Or, as an alternative construction, I may employ resilient washers or separating members of the type shown in Figs. 5 and 6, each washer of this type comprising a flat, rectangular piece of spring steel or other metal 9, opposite ends of which are provided with a series of slits to form tongues 10, adjacent tongues being bent on opposite sides of the plate and constituting spring fingers. Or, as a further alternative construction, I may employ resilient washers or separating members of the type shown in Figs. 7 and 8. In this form of my invention, I employ a flat rectangular piece of spring steel or other metal 11, the two short ends of which are bent inwardly to provide resilient end portions 12. When using this form of washer, two of the members 11 are placed back to back with the resilient end portion 12 extending in opposite directions toward adjacent blades, as clearly shown in Fig. 7. Each of the alternative forms of resilient washers or separating members 8, 9 and 11, is provided with a transverse, non-circular, preferably rectangular opening 13, corresponding to the openings in the blade members 1.

The handle portion of my improved multiple blade knife may consist of a strip of resilient metal 14 bent upon itself to form a gripping portion, the two ends of the strip having alined, non-circular, preferably rectangular openings corresponding to the openings in the blade member 1. Preferably, the side portions of the strip 14 are rolled or bent inwardly as clearly shown in Figs. 1 and 2 to afford a comfortable gripping or handle portion.

Having thus described the details of construction of my improved multiple blade knife, I will now refer to the method of assembling said details to provide my device, it being noted that in the drawings I have shown a knife comprising six blades and five washers, but obviously my invention is not restricted to this number of blades, as the total number of blades can be increased or decreased to suit the particular needs or wishes of the operator. When assembling a six blade knife, the bolt 4 is inserted through the opening in one of the blades 1 until the bolt-head 5 rests against the outer surface of the blade. The bolt 4 is next inserted through the opening 13 in one of the resilient separating washers 8, 9 or 11. A second blade is then applied on the bolt 4 and then a second resilient separating washer is applied. Two of the blade members 1 are then placed on opposite sides of one of the washers, and the two arms of the handle member 14 are placed on the outer surface of the two blades and interposed washer. The bolt 4 is then passed through the alined openings in the arms of the handle, two blades and interposed washer, and a fourth washer is then applied on the bolt; then a blade member 1; then a fifth washer; then a sixth blade 1, and finally, the adjusting screw 7 is threaded in the bolt 4 to a position where it abuts the outer face of the last applied blade member 1. It is to be noted that the non-circular, preferably rectangular, shape of the bolt 4 and the corresponding shape of the openings in the blade members, resilient washers, and handle members, while permitting the parts to have axial sliding movement with respect to the bolt, tends to retain the blades in their proper extended position at one side of the bolt 4 and the handle member 14 in the proper extended position at the opposite side of the bolt. The non-turning relationship existing between the bolt, blades, washers and handle members, due to the bolt of non-circular cross section and the corresponding non-circular openings, is the preferred form of my device, but it is apparent that other means might be resorted to to accomplish the same purpose.

Referring now to the operation of my improved multiple blade knife made and assembled in accordance with the above description, it is to be noted that when the adjusting nut 7 is turned to travel toward the head 5 of the bolt 4, the resilient washers or separating members 8, 9 or 11 will be compressed and the blades brought closer together, the space between the spaced, parallel blades 1 being variable between the minimum and maximum compression of the said washer members, i. e., the maximum distance between the blades and consequently the maximum thickness of slice or cut will be obtained when there is a minimum of compression, whereas the minimum distance between the blades and consequently the minimum thickness of slice or cut will be obtained when there is a maximum of compression, the degrees of compression being effected through the instrumentality of the adjusting nut 7 on the bolt 4.

It will be understood that the forms of my invention herein shown and described are to be taken as preferred embodiments of the same and that numerous changes may be made in the shape, size and arrangement of parts without departing from the spirit of my invention or the scope of the subjoined claims.

Having thus described my invention, I claim:—

1. A multiple blade knife comprising a plurality of blades each having a non-circular opening therein, a blade supporting shaft of non-circular cross section passing through said openings, a plurality of resilient washers each having a non-circular opening adapted to receive therethrough the non-circular supporting shaft, said washers being positioned on the shaft between each pair of blade members, and means for compressing the resilient washers to uniformly and simultaneously decrease the distance between the individual blade members.

2. A multiple blade knife comprising a supporting shaft of non-circular cross section, a plurality of blades mounted on said shaft and extending from one side thereof, each of said blades having a non-circular opening therein which cooperates with the non-circular shaft to permit said blades to move axially of the shaft but prevents said blades from rotating with respect to said shaft, a plurality of resilient washers mounted on said shaft and positioned between each pair of blade members thereon, and means on the supporting shaft for uniformly and simultaneously compressing the resilient washers to decrease the distance between the individual blade members.

3. A multiple blade knife comprising a supporting shaft of non-circular cross-section, a plurality of blades mounted on said shaft and having non-circular openings through which the shaft is slidable, a plurality of resilient washers mounted on said shaft and having non-circular openings through which the shaft is slidable, one of said washers being positioned between each pair of blade members, the non-circular shaft and the non-circular opening in the blades and washers preventing said blades and washers from rotating with respect to the shaft, and means for compressing the resilient washers to uniformly and simultaneously decrease the distance between the individual blade members.

4. A multiple blade knife comprising a supporting shaft of non-circular cross section, a plurality of blades mounted on said shaft and having non-circular openings through which the shaft is slidable, a handle mounted on said shaft, and having a non-circular opening through which the shaft is slidable, the non-circular shaft and the non-circular openings in the blades and handle preventing said blades and handle from rotating with respect to the shaft, a plurality of resilient washers mounted on said shaft, one of said washers being positioned between each pair of blade members, and means on the supporting shaft for compressing the resilient washers to uniformly and simultaneously decrease the distance between the individual blade members.

5. A multiple blade knife comprising a supporting shaft of non-circular cross-section, a plurality of blades mounted on said shaft and extending from one side thereof in parallel spaced relation, each of said blades having a non-circular opening therein which cooperates with the non-circular shaft to permit said blades to move axially of the shaft but preventing said blades from rotating with respect to said shaft, a handle including spaced arms mounted on said shaft and extending therefrom at an angle to said blades, each of said arms having a non-circular opening therein which cooperates with the non-circular shaft to permit said blades to move axially of the shaft but preventing said handle from rotating with respect to said shaft, a plurality of resilient washers mounted on the shaft, one of said washers being positioned between each pair of blade members and between the spaced arms of the handle, and means for compressing the resilient washers to uniformly and simultaneously decrease the distance between the individual blade members.

6. A multiple blade knife comprising a supporting shaft, a plurality of blades slidably mounted thereon, a resilient handle member having two spaced arms slidably mounted on the shaft, a plurality of resilient washers mounted on said shaft, one of said washers being positioned between each of the blades and between the arms of the handle member, and means for compressing the resilient washers to uniformly and simultaneously decrease the distance between the blade members.

7. A multiple blade knife comprising a supporting shaft, a plurality of blades mounted on said shaft, a plurality of metal washers mounted on the shaft in pairs, one pair between each pair of blade members thereon, each pair of washers having bent out resilient end portions extending toward the adjacent blades, and means for compressing the resilient end portion to uniformly and simultaneously decrease the distance between the individual blade members.

8. A multiple blade knife comprising a supporting shaft, a plurality of blades slidably mounted thereon, a handle member slidably mounted on the shaft, a plurality of compressible rubber washers mounted on the shaft, one of said washers being positioned between each of the blades, means for preventing said blades, washers and handle from turning on the shaft, and means for compressing the rubber washers to uniformly and simultaneously decrease the distance between the individual blade members.

In testimony whereof I hereunto affix my signature.

LAURENCE J. PURCELL.